United States Patent
Voss

(10) Patent No.: US 9,603,314 B2
(45) Date of Patent: Mar. 28, 2017

(54) VEHICLE WITH FELLER FOR TREE LIMB REMOVAL IN RESIDENTIAL, COMMERCIAL, MUNICIPAL, UTILITY, AND LINE CLEARANCE APPLICATIONS

(71) Applicant: Daniel D. Voss, Hartford, WI (US)

(72) Inventor: Daniel D. Voss, Hartford, WI (US)

(*) Notice: Subject to any disclaimer, the term of this patent is extended or adjusted under 35 U.S.C. 154(b) by 0 days.

(21) Appl. No.: 15/132,845

(22) Filed: Apr. 19, 2016

(65) Prior Publication Data

US 2017/0042100 A1    Feb. 16, 2017

Related U.S. Application Data

(60) Provisional application No. 62/203,096, filed on Aug. 10, 2015.

(51) Int. Cl.
A01G 23/097 (2006.01)
A01G 23/081 (2006.01)
B27B 17/00 (2006.01)

(52) U.S. Cl.
CPC ......... A01G 23/097 (2013.01); A01G 23/081 (2013.01); B27B 17/0083 (2013.01)

(58) Field of Classification Search
CPC .... A01G 23/08; A01G 23/081; A01G 23/083; A01G 23/085; A01G 23/091; A01G 23/093; A01G 23/095
See application file for complete search history.

(56) References Cited

U.S. PATENT DOCUMENTS

| | | | |
|---|---|---|---|
| 3,866,639 A * | 2/1975 | Kantola | A01G 23/08 144/208.9 |
| 3,886,985 A * | 6/1975 | Iarocci | A01G 23/085 144/339 |
| 3,896,862 A | 7/1975 | Windsor | |
| 4,004,622 A * | 1/1977 | Hamilton | A01G 23/083 144/24.13 |
| 4,269,241 A | 5/1981 | Hickman | |
| 4,522,239 A | 6/1985 | Gaitten | |
| 5,129,438 A * | 7/1992 | Hamilton | A01G 23/081 144/24.13 |
| 6,408,906 B1 | 6/2002 | Moon et al. | |
| 7,086,435 B1 | 8/2006 | Coulbourn, Jr. | |
| 7,882,864 B2 | 2/2011 | Fargeot | |
| 8,176,954 B1 | 5/2012 | Coulbourn, Jr. | |
| 2012/0279614 A1 | 11/2012 | Terrell | |

(Continued)

FOREIGN PATENT DOCUMENTS

WO    2011/078673 A1    6/2011

OTHER PUBLICATIONS

Terratech, Inc., The Treemaster Series—Urban/Rural Vegetation Management, 2 pages from website at http://www.terratechmfg.com/treemaster-series; copyright 2011.

*Primary Examiner* — Matthew G Katcoff
(74) *Attorney, Agent, or Firm* — Quarles & Brady LLP

(57) ABSTRACT

A truck for tree limb removal is disclosed in residential, commercial, municipal, utility, and line clearance applications. The truck includes a vehicle chassis supporting a plurality of wheels. A boom is supported by the vehicle chassis. This boom has an attachment end attached to the vehicle chassis at an attachment joint and a tool-supporting end rotatable and extendable relative to the attachment joint. A feller buncher tool is attached to the tool-supporting end of the boom.

20 Claims, 6 Drawing Sheets

(56) References Cited

U.S. PATENT DOCUMENTS

| | | | |
|---|---|---|---|
| 2012/0279615 A1* | 11/2012 | Terrell | A01G 23/095 144/343 |
| 2013/0235205 A1* | 9/2013 | Lappalainen | A01G 23/08 348/148 |
| 2014/0283951 A1* | 9/2014 | Bisballe | A01G 23/083 144/402 |
| 2016/0054739 A1* | 2/2016 | Palmroth | A01G 23/00 701/50 |

* cited by examiner

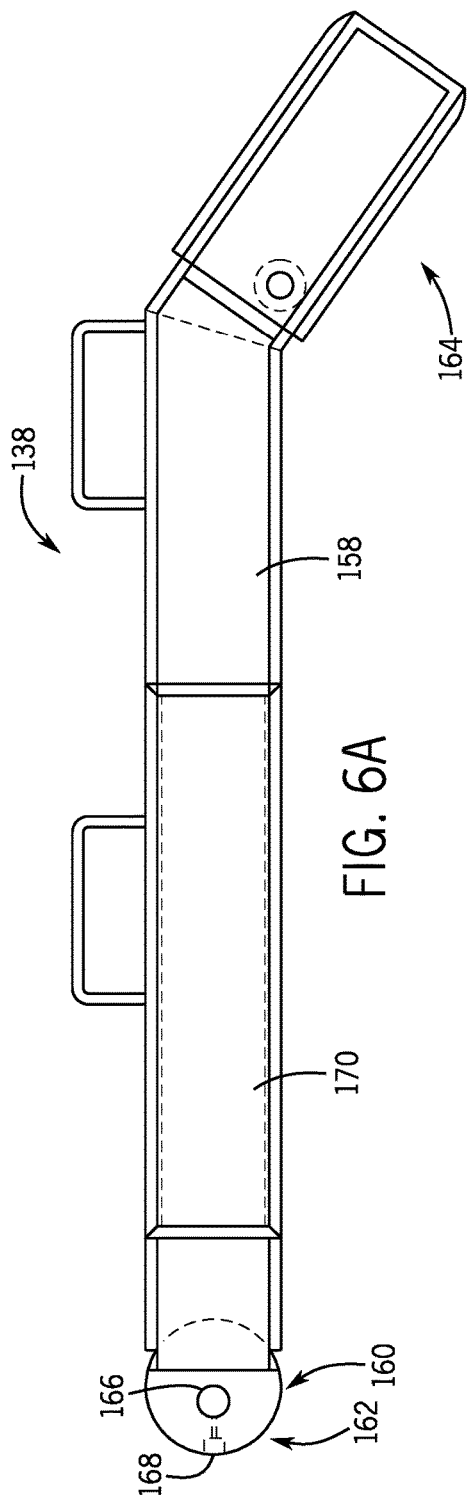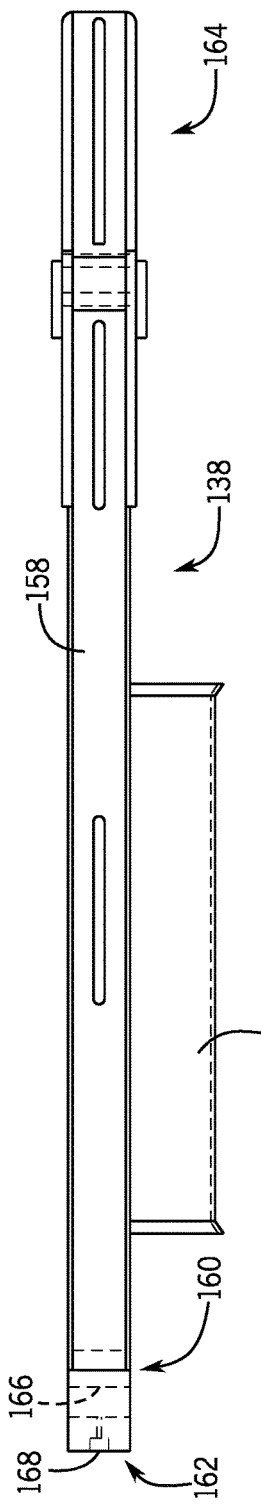

VEHICLE WITH FELLER FOR TREE LIMB REMOVAL IN RESIDENTIAL, COMMERCIAL, MUNICIPAL, UTILITY, AND LINE CLEARANCE APPLICATIONS

CROSS-REFERENCE TO RELATED APPLICATIONS

This application claims the benefit of U.S. Provisional Patent Application No. 62/203,096 filed Aug. 10, 2005 which is hereby incorporated by reference for all purposes as if set forth in its entirety herein.

STATEMENT REGARDING FEDERALLY SPONSORED RESEARCH OR DEVELOPMENT

None.

BACKGROUND

This application relates devices for tree limb removal in residential, commercial, municipal, utility, and line clearance applications.

Conventionally, in order to remove limbs on a tree, a crew member with a chainsaw would need to be lifted in a bucket on a boom to an appropriate location in a tree or climb the tree using a harness and ropes. At this location and height, various tens of feet above the ground, the crew member operates the chainsaw to remove segments of the tree, one at a time, so that the segments can fall to the ground. These separated tree branches and parts, once they have fallen to the ground or are lowered using ropes, are then typically collected and placed in a chipper. For larger portions of the tree such as a trunk, a crew member may be able to operate the chainsaw at ground level.

These traditional ways of removing a tree are very labor and time intensive. A traditional crew can require many members and these crew members need to be well coordinated so that the bucket operator or climber is properly positioned and so that the crew members on the ground stay out of the drop zone of the branches during cutting by the crew member climbing or in the bucket. Moreover, these traditional methods required that at least one crew member be placed at a high elevation in order reach appropriate cut points and then operate cutting machinery at this height.

SUMMARY

Disclosed herein is an improved truck for tree limb removal in which a feller buncher tool is attached to the end of a boom. Rather than place a crew member in a bucket on a boom and navigate them to the appropriate cut point, as has been traditionally done, an operator may remain on the ground directing the feller buncher tool up in the tree to the desired cut locations before grabbing and cutting the branch of interest via remote control. The grabbing arms on the feller buncher tool can then be used to transport the cut tree segment to the desired location for chipping or collection of logs for larger tree segments without the need of a ladder or manual labor.

Among other things, this improved tree limb removal truck can avoid the need to place a crew member in a bucket or climb with a chainsaw or other cutting implement, can reduce the possibility of a cut tree part falling on crew members in the work space below the cutting site as the grabbing arms retain the cut tree part in its grasp after the tree has been cut, and can reduce the amount of manual transport of felled tree parts on the ground. In aggregate, a large tree removal job that may have taken over a day to do in the past may now be done in a few hours and with significant reductions in the labor required to perform the job. In some instances, crews of three, four or five members can be reduced to two members.

According to one aspect of this invention, a truck for tree limb removal in residential, commercial, municipal, utility, and line clearance applications is provided. The truck includes a vehicle chassis supporting a plurality of wheels. A boom is supported by the vehicle chassis. This boom has an attachment end attached to the vehicle chassis at an attachment joint and a tool-supporting end rotatable and extendable relative to the attachment joint. A feller buncher tool is attached to the tool-supporting end of the boom.

In some forms, the feller buncher tool may include at least a pair of opposing clamping arms configured to grasp a portion of a tree and a moveable cutting element extendable to cut the tree to sever the grasped portion from a remainder of the tree. The moveable cutting element may be a chainsaw, but could be other types of cutting implements as well. A portion of the feller buncher tool that includes the opposing clamping arms may be pivotable about a pivoting axis about another portion of the feller buncher tool, thereby accommodating a portion of a tree which is being grasped by the at least a pair of opposing clamping arms that is being cut to continue to be grasped by the at least a pair of opposing clamping arms as the portion of the tree is severed and removed from the tree under control.

In some forms, the truck may further include a truck bed attached to the vehicle chassis for the storage of logs.

In some forms, the boom may include multiple segments. The multiple segments may include at least one extendable segment that can be varied in length by a telescoping extension of a plurality of sections of the at least one extendable segment. At least some of the multiple segments may be hinged with respect to one another and a hydraulic element may alter an angle of the multiple segments with respect to one another.

In some forms, the boom may be rotatable about a vertical axis to position the feller buncher tool with respect to the truck. To offer a full range of motion, the boom may be rotatable about a vertical axis in excess of 360 degrees.

In some forms, the truck may further include one or more hydraulic lines that extend up the boom to the feller buncher tool. These hydraulic line(s) can provide power to the feller buncher tool.

In some forms, a remote control device may be operable to control the boom and the feller buncher tool. With the assistance of the remote control device, an operator on the ground (with an excellent field of vision may based on the operator's placement) may be able to view the entire work area and manipulate the boom and feller buncher tool in order to efficiently run the machine and crew, view traffic, and other potential hazards.

Again, in some forms, the truck may be specially adapted for use in residential, commercial, municipal, utility, and line clearance applications in contrast to conventional logging equipment. Accordingly, the truck may be more akin to a standard road utility vehicle than traditional logging equipment, which has an extremely heavy base and is typically design for all terrain operation and would be unsuitable for routine transport on public roads.

According to another aspect, a method of removing a tree is disclosed. The method involves grasping a portion of the tree using a feller buncher tool that is attached to a tool-supporting end of a boom attached to a truck for tree removal in residential, commercial, municipal, utility, and line clearance applications. The tree is then cut using the feller buncher tool to sever the portion of the tree that is grasped by the feller buncher tool from a remainder of the tree.

In some forms, the feller buncher tool may include at least a pair of opposing clamping arms and a moveable cutting element. Accordingly, the step of grasping the portion of the tree using the feller buncher tool may involve grasping the portion of the tree using the pair of opposing clamping arms and the step of cutting the tree using the feller buncher tool may involve extending the cutting element, such as a chainsaw, to cut the grasped portion of the tree.

In some forms, in order to permit the severed portion of the tree to controllably be severed and partially fall downward, at least a portion of the feller buncher tool (including the at least the pair of opposing clamping arms) may be pivotable about a pivoting axis about another portion of the feller buncher tool. This accommodating the portion of the tree which is being grasped by the clamping arms and is being cut to continue to be grasped by the clamping arms as the portion of the tree that is severed and/or is separated from the tree under full control.

In some forms, the boom may be supported by a vehicle chassis supporting a plurality of wheels and the boom may have an attachment end attached to the vehicle chassis at an attachment joint. The tool-supporting end of the boom may be rotatable and extendable relative to the attachment joint.

In some forms, the method may further include the steps of transporting the portion of the tree that has been severed from the remainder of the tree to a chipper and chipping the portion of the tree. However, it is also contemplated that, in some forms, large severed tree portions may be placed in a truck bed or elsewhere rather than be chipped.

Still according to other forms and in a more general sense of use, a vehicle for tree limb removal in residential, commercial, municipal, utility, and line clearance applications is disclosed. The vehicle includes a vehicle chassis, a boom, and a feller buncher tool. The boom is supported by the vehicle chassis at an attachment end that is attached to the vehicle chassis at an attachment joint and a tool-supporting end rotatable and extendable relative to the attachment joint. The feller buncher tool is attached to the tool-supporting end of the boom.

In some forms, it is contemplated that this vehicle may be a truck. However, it is contemplated that this vehicle may take other forms as well. As one example, the vehicle could be a floating barge or boat supporting the boom with the attached feller buncher tool.

Among other things, this new truck or vehicle massively improves the efficiency with which a tree limbs and whole trees can be removed in residential, commercial, municipal, utility, and line clearance applications. Whereas a traditional bucket crew might only be able to remove a large tree or two in a day, this truck incorporating the feller buncher tool can remove most trees within an hour or two with a smaller crew - in most instances, only two crew members are sufficient. Furthermore, utilizing remote operation, the operator and all employees can easily remain at a safe distance from the cut and drop area and no one is required to be at the cut location up in a bucket or climbing operating cutting equipment at a great height.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

FIG. 4 illustrates a feller buncher tool for use with this truck with the chainsaw partially extended.

FIGS. 6A and 6B are detailed top and side views of the short extension arm.

DETAILED DESCRIPTION

Figure 1:
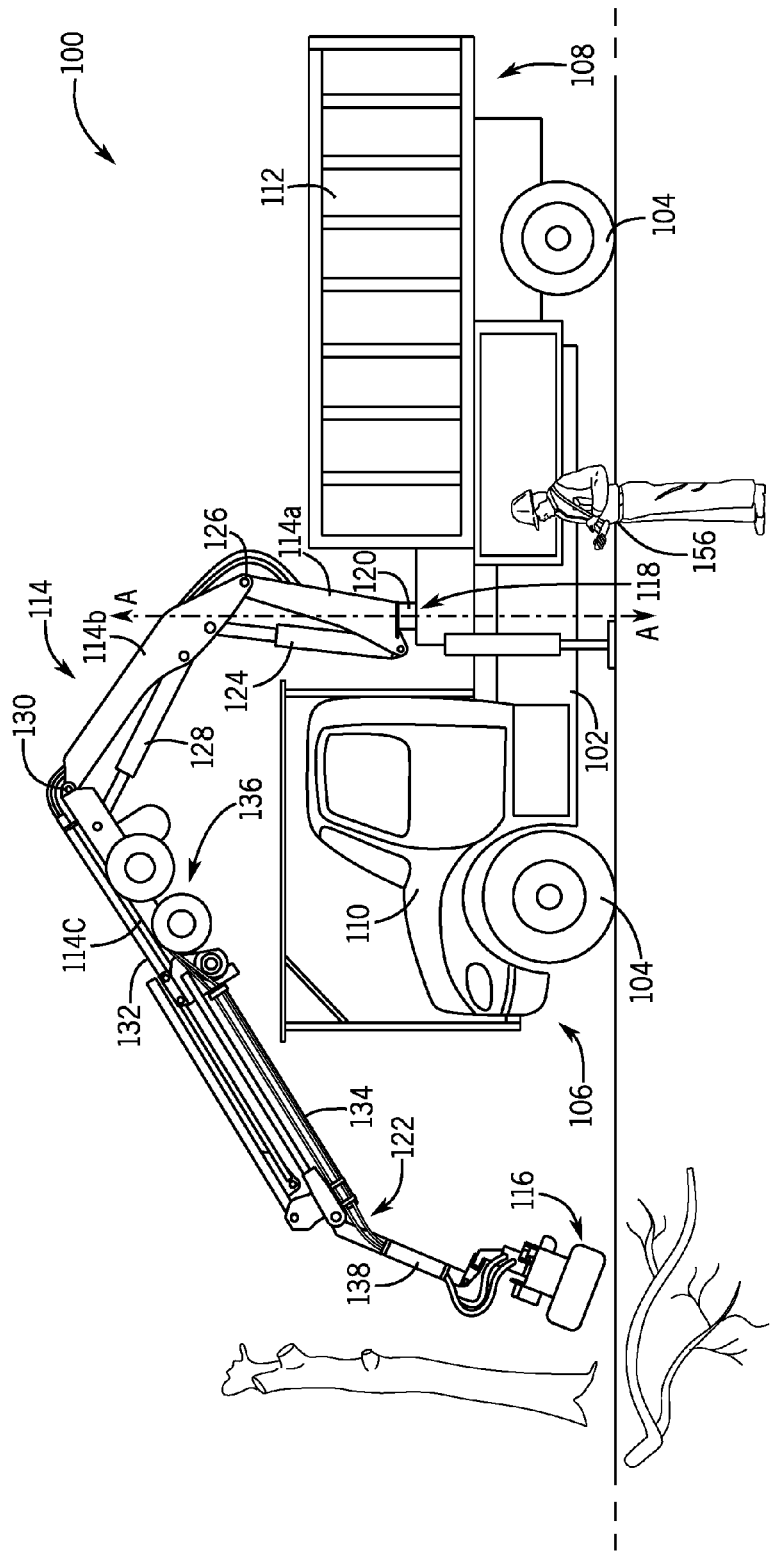
FIG. 1 illustrates a truck for tree removal in residential, commercial, municipal, utility, and line clearance applications.
Figure 2:
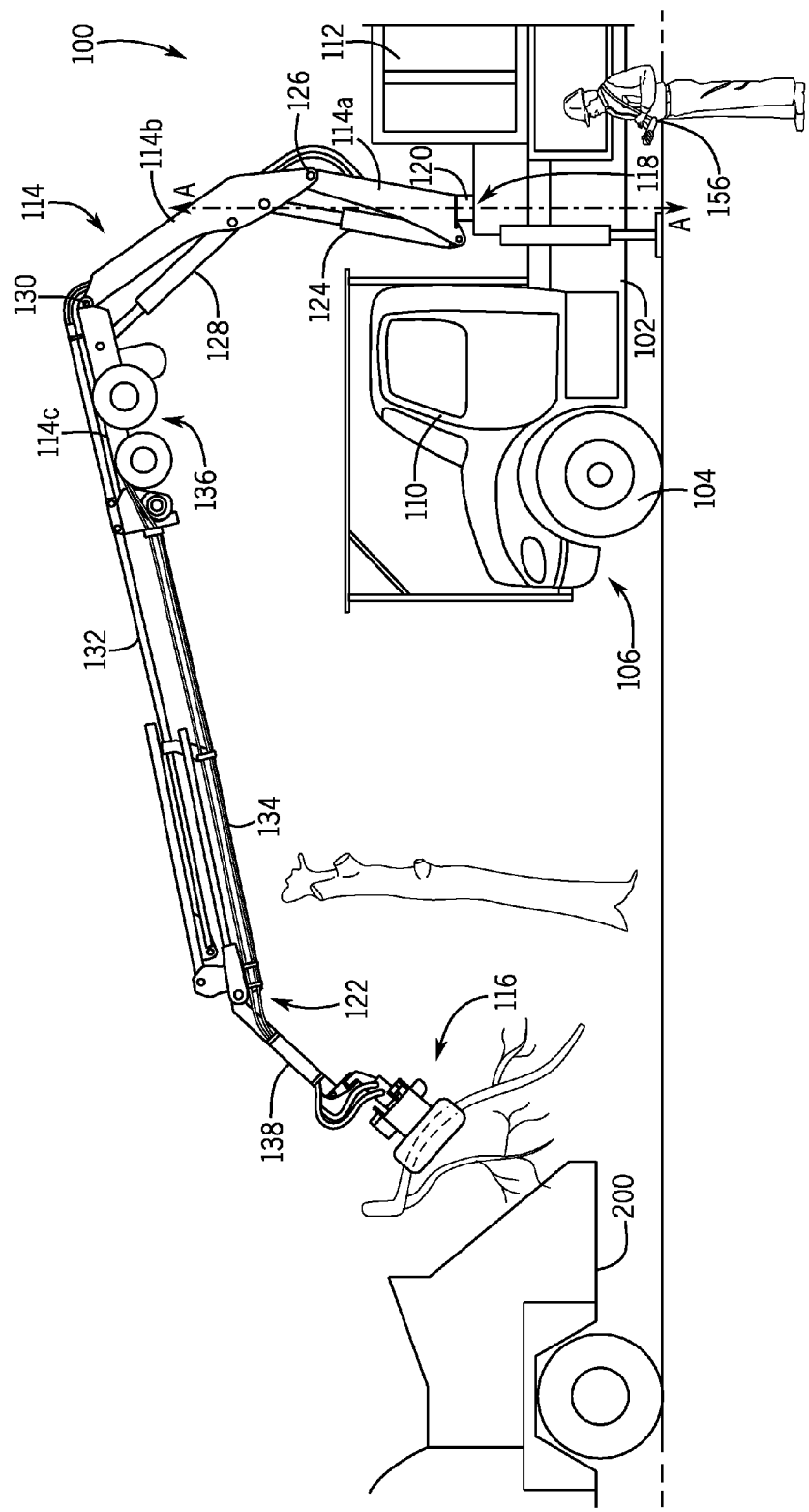
FIG. 2 illustrates the forward end of the truck of FIG. 1 further illustrating the boom supporting the feller buncher tool in which a branch removed from the tree is being grasped by the pair of arms of the feller buncher tool for insertion into a chipper.

Referring to FIGS. 1 and 2, a truck 100 according to one aspect of the invention is illustrated. This truck 100 is designed to remove limbs of trees and tree portions up to and including the entire tree in residential, commercial, municipal, utility, and line clearance applications. Typically, a truck of this type is in the weight range of 26,000 pounds to 46,000 pounds (which are of a size requiring a Class A or B commercial driver's license) or, in some instances, in the weight range of 26,000 pounds to 33,000 pounds (which are of a size requiring a Class A commercial driver's license). It should be appreciated that this truck is very different than traditional logging equipment which usually has a very dense and heavy body and is adapted to primarily operate in rugged natural environments and grab trees near the base.

The truck 100 includes a vehicle chassis 102 or body which supports the other portions of the truck 100. The vehicle chassis 102 supports various components for operation and transport of the vehicle including the wheels 104, an engine, drive train components, and various truck components which are commonly found on trucks, especially utility trucks. The truck 100 extends from a forward end 106 to a rearward end 108. The forward end 106 has a cabin 110 for a driver and passenger and the rearward end 108 includes a truck bed or bucket 112 in which cut logs might be stored. It will be appreciated that the particular configuration of the truck 100 illustrated is exemplary, but should not be considered limiting, as other alternative styles of truck design could also be employed.

Although it is not expressly shown in the figures, this truck also supports a hydraulic system which can be run from the engine of the truck 100. This hydraulic system can be used to power and cause actuation of many of the components that are described below (for example, hydraulic pistons and the feller buncher tool) via hydraulic lines.

Notably, the truck 100 also has a boom 114 that supports a feller buncher tool 116. The boom 114 extends from an attachment end 118 attached to the vehicle chassis 102 at an attachment joint 120 and a tool-supporting end 122 that supports the feller buncher tool 116. In the particular form illustrated, the attachment joint 120 at which the attachment end 118 of the boom 114 is connected to the vehicle chassis 102 of the truck 100 is located between the forward cabin 110 and the rearward truck bed or bucket 112. However, it will be readily appreciated that the boom 114 could be attached to a truck in other locations (for example, closer to the rearward end 108) depending on the particular design of the truck. In the form illustrated, the boom 114 includes multiple segments including a base segment 114a, an intermediate segment 114b, and an extendable distal segment 114c.

The attachment joint 120 accommodates the rotation of the boom 114 about a generally vertical axis A-A (in the particular form illustrated, this rotation occurs at the attachment joint 120 at the connection of the base segment 114a of the boom 114 to the joint 120). In this way, the feller buncher tool 116 supported at the end of the boom 114 can be rotated about the attachment joint 120 to help facilitate movement of the feller buncher tool 116 relative to the truck 100.

In some forms, the angular rotation about the vertical axis A-A may be limited by the hydraulic lines. For example, the range of rotation may be limited to approximately 360 degrees to avoid twisting or wrapping of the lines about the boom 114. However, if the attachment joint 120 includes hydraulic connections that are not so limited in rotation, then the boom 114 may be able to rotate fully and freely about axis A-A without being limited by the twisting of hydraulic lines.

The segments 114a-c of the boom 114 are also extendable relative to the attachment joint 120 and hinged or pivotable relative to one another.

In the form illustrated, the intermediate segment 114b of the boom 114 is hingedly connected to the base segment 114a. A first hydraulic cylinder 124 can be extended to alter the angle between the base segment 114a and the intermediate segment 114b about hinged point of connection 126 therebetween, thereby permitting the distal end of the intermediate segment 114b to be raised or lowered relative to ground level.

The extendable distal segment 114c of the boom 114 is also hingedly connected to the intermediate segment 114b (at the end of the intermediate segment 114b opposite the hinged connection between the intermediate segment 114b and the base segment 114a). A second hydraulic cylinder 128 can be extended to alter the angle between the intermediate segment 114b and the extendable distal segment 114c about hinged point of connection 130 therebetween, thereby permitting the distal end of the extendable distal segment 114c to be raised or lowered relative to ground level (as well as the feller buncher tool 116 attached to this distal end).

As shown, the extendable distal segment 114c of the boom 114 further includes multiple telescoping and extendable sections that can be extended or retracted via a use of a third hydraulic cylinder 132. In this way, the distal end of the extendable distal segment 114c can be moved relative to the hinged point of connection 130.

Hydraulic lines 134 extend up along the boom 114 to the feller buncher tool 116. These hydraulic lines 134 can potentially be run through the interior of some or all of the boom segments or be exposed on the exterior of the segments. To the extent they are external and in a position in which they exposed to falling braches, protection or covering of the lines 134 is advisable to avoid damage to them. In the form shown, the hydraulic line 134 is partly coiled on a spool mechanism 136 that permits the lines 134 to be extended or retracted therefrom as the extendable distal segment 114c is actuated.

Figure 3:
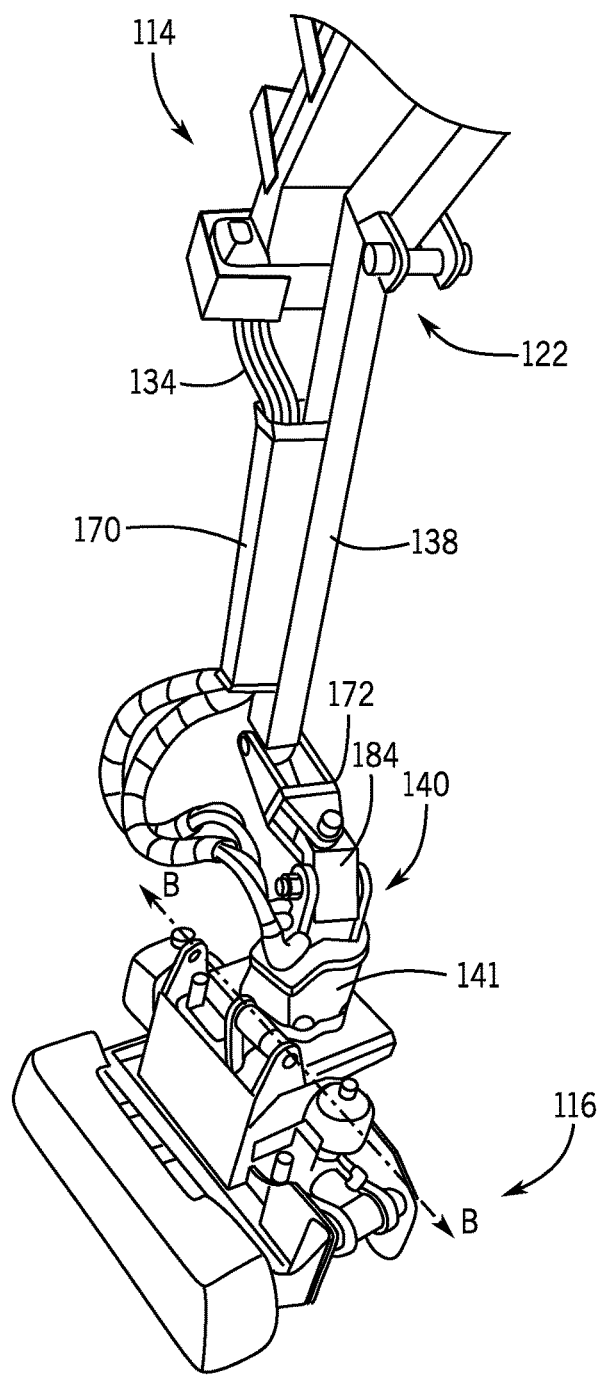
FIG. 3 is a detailed perspective view of the feller buncher tool at the tool-supporting end of the boom in which the feller buncher tool is connected to the end of the short extension arm by a bracket at a connection joint.

With additional reference to FIG. 3, at the distal end of the extendable distal segment 114c of the boom 114, a feller buncher tool 116 is supported. This feller buncher tool 116 is affixed at the end of a short extension arm 138 to provide space between the feller buncher tool 116 and the boom 114. The feller buncher tool 116 is connected to the end of the extension arm 138 at a joint 140 and a rotator 141 which are disposed in series with one another.

The joint 140 and the rotator 141 permit the feller buncher tool 116 to be rotated and manipulated with respect to the end of the short extension arm 138. The joint 140 permits free rotation in various directions, while the rotator 141 (which may be a Rotator GV 12R8 from Indexator Rotator Systems of Vindeln, Sweeden) enables a full 360 degrees of continuous rotation of the feller buncher tool 116 about the connected end of the joint 140 when the tool 116 is empty to position the tool 116 or when a limb or other tree portion is grasped by the tool 116.

The feller buncher tool 116 shown in FIG. 3 is further schematically illustrated in FIG. 4, because in FIG. 3 the parts of the feller buncher tool 116 are somewhat obscured by the viewing angle. This particular feller buncher tool 116 is manufactured and made available from Gierkink Machine Techniek VB of Norway and which is described in greater detail in their international patent application publication of WO 2011078673 published Jun. 30, 2011 and entitled "Head for Harvesting Trees and Vehicle Provided with Such a Head" which is incorporated herein by reference.

In short summary and with particular reference to FIG. 4, the feller buncher tool 116 includes at least a pair of opposing clamping arms 142 provided with a hydraulic actuator 144. These arms 142 are illustrated in the closed position, but may be opened by the retraction of hydraulic actuator 144. These arms 142 can be opened and closed to grab a branch in the space indicated by reference numeral 146. The feller buncher tool 116 also includes a chainsaw 148 provided with a hydraulic motor 150. This chainsaw 148 is movable via a hydraulic actuator 152 which can actuate chainsaw 148 in an out of the saw casing 154. When a branch is grasped, the chainsaw 148 is initially in the saw casing 154 (to provide clearance from the branch) and then the chainsaw 148 can be extended out of the casing 154 (such as is shown in FIG. 4) to cut the branch in the space 146. The feller buncher tool 116 also includes a tilting mechanism that permits the arms 142 to tilt, pivot, or hinge downward with respect to the chainsaw 148. This axis of pivoting B-B is illustrated on FIG. 3. This ability to pivot allows the chainsaw 148 to remain relatively stationary while the arms grabbing the branch or other tree part pivot down away from the cut.

Returning back to FIG. 3 and with additional reference being made to FIGS. 5A, 5B, 6A, 6B, 7A, and 7B various components are illustrated which link feller buncher tool 116 to the tool-supporting end 122 of the boom 114.

Looking specifically at FIGS. 6A, and 6B, the short extension arm 138 from FIG. 3 is shown in greater detail. The short extension arm 138 includes a generally tubular body 158 extending from the bracket-connecting end 160 having a curved connection 162 to a boom-connecting end 164 for attachment to the distal end of the boom 114 with an opening 166 for reception of a pin. In the form illustrated, the walls of the tubular body are approximately ⅛ inch although the boom-connecting end 164 may be reinforced to a thickness of ¼ inch. On the curved connection 162, there is a through hole 168 which can receive a pin, rod or bolt for connection with the bracket parts of the joint 140. This through hole 168 can have a counter-bored opening adapted for receiving a grease fitting for lubrication. There is also a tubular side channel 170 extending along the side of the extension arm 138 which acts as a guard for the hydraulic lines 134. All of the structural areas may be welded around.

Figure 5A:
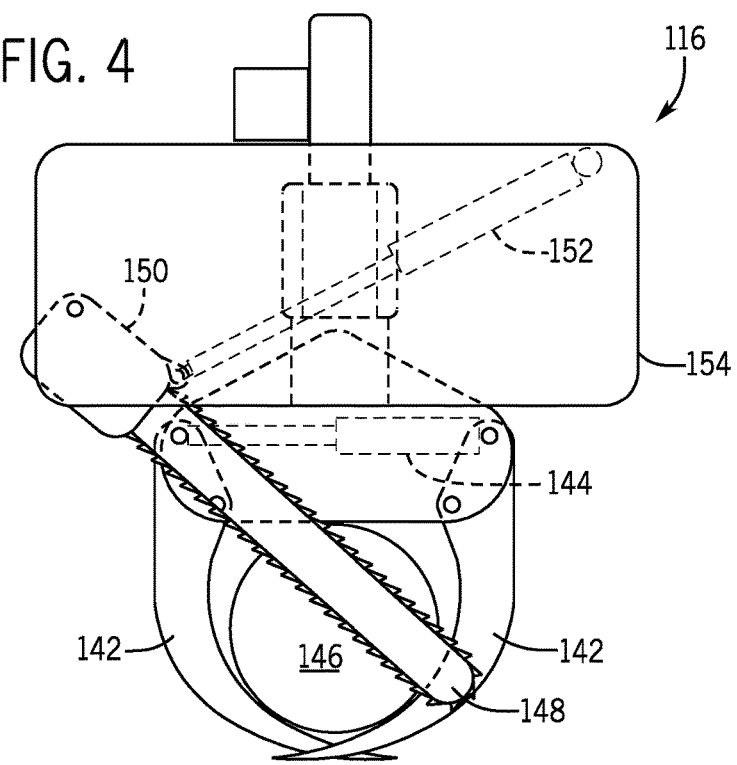
FIGS. 5A and 5B are a pair of side views of a first part of the bracket connecting the feller buncher tool to the short extension arm.
Figure 5B:
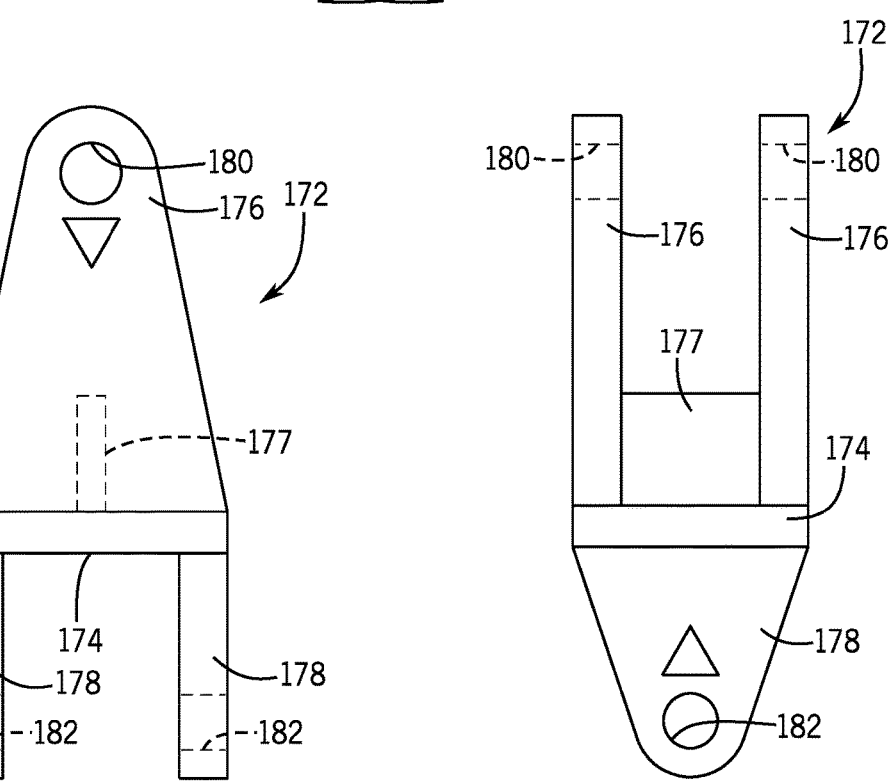

Turning now to FIGS. 5A and 5B, a first bracket part 172 of the joint is illustrated. The first bracket part 172 includes a central base 174 having a pair of spaced walls 176 and 178 extending perpendicularly from each side thereof respectfully. The pair of spaced walls 176 has a perpendicular support wall 177 spanning therebetween which is shorter than the full height of the side walls 176. Each of these pairs of spaced walls 176 and 178 have openings 180 and 182 extending therethrough respectively to receive a pivot pin in the final assembly. The orientation of the pair of spaced walls 176 on the central base 174 are rotated 90 degrees from the orientation of pair of spaced walls 178 such that the two axes of rotation extending through the openings 180 and 182 of the bracket part 172 are perpendicular and offset from one another. The openings 180 are designed for connection with the opening 166 of the boom-connecting end 164 of the short extension arm 138 whereas the openings 182 are designed for connection with a second bracket part 184 next described.

Figure 7B:
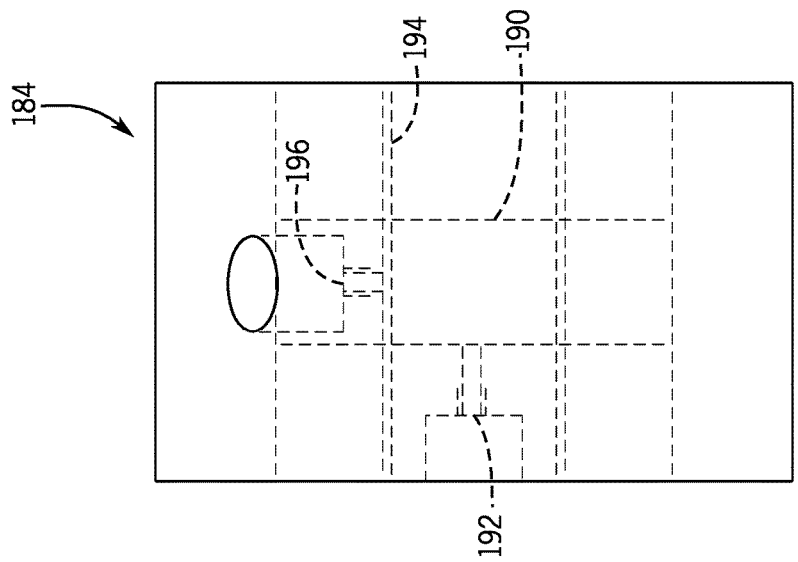
FIGS. 7A and 7B are detailed side and front views of a second part of the bracket connecting the feller buncher tool to the short extension arm.
Figure 7A:
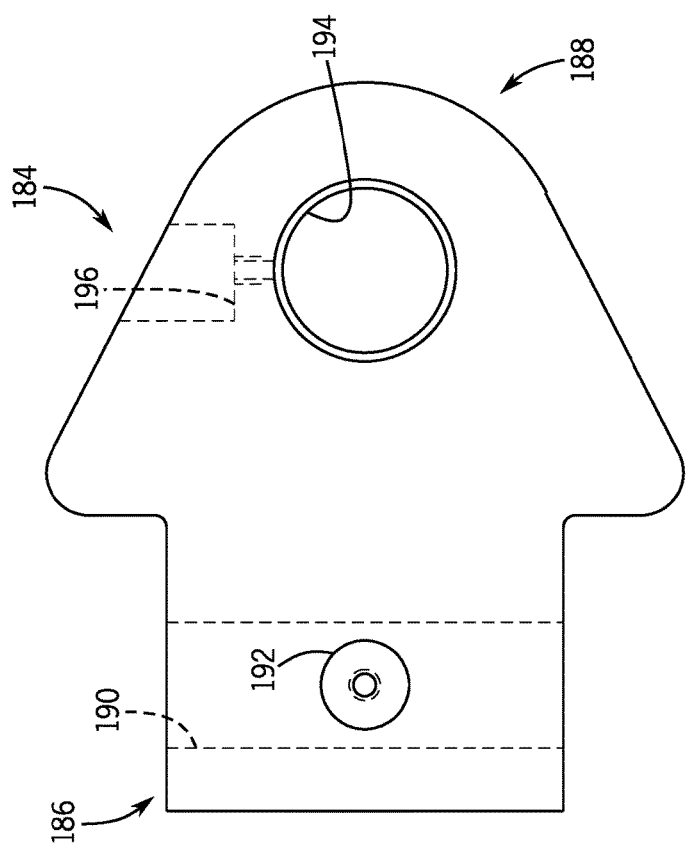

Turning now to FIGS. 7A and 7B, the second bracket part 184 is generally arrow shaped and having a constant thickness having a tail end 186 and a head end 188. The tail end 186 has an opening extending 190 extending perpendicular to the direction of the thickness and perpendicular to the direction of tail extension toward the head end 188. This opening 190 will share an axis of rotation with the opening 182 on the first bracket part 172 when a pin is received therethrough. An opening 192 for a grease fitting extends from a major surface of the bracket 184 into this opening 186. Another opening 194 extends through the thickness direction of the bracket 184 centrally in the head end 188. This opening 194 has an opening 196 for a grease fitting extending into the opening 194. The opening 194 will be connected to the support mount for the feller buncher tool 116.

In aggregate, these connections offer a wide range of motion for the feller buncher tool 116 relative to the short extension arm 138. The joint 140 is a free swinging joint and the arm 138 holds the feller buncher tool 116 and limbs away from the boom 114 to prevent damage.

With reference back to FIGS. 1 and 2, a user operable remote control device 156 is shown. This remote control 156 can include a number of controls for operating both the boom 114 (such as for example, the rotational angle of the boom 114 relative to the vehicle chassis 102 and the height and extension of the tool 116 supported by the boom 114) and the feller buncher tool 116 itself. While a remote control device 156 is illustrated, it is contemplated that a control device 156 might be hard wired or be part of a separate cage or cabin in which the operator of the boom and feller buncher tool sits.

In use, the truck 100 can be driven to a job site for tree removal. The truck 100 is then fixed in place, potentially employing side supports 198 to prevent side-to-side movement of the truck 100 as various off-center loads are applied. The operator then manipulates the boom 114 using the remote control 156 to move the feller buncher tool 116 into a desired location (e.g., adjacent a branch or other portion of the tree for removal). The arms 142 of the feller buncher tool 116 are opened such that the arms 116 can be placed on opposing sides of the portion of the tree for removal. The operator then closes the arms 116 such that they firmly grasp the portion of the tree to be removed. The operator then instructs the movable cutting tool 148 (typically a chainsaw) to be turned on for cutting and extended to cut and sever the portion of the tree being held from the remainder of the tree. Because of the pivoting head of the feller buncher tool 116, the removed portion of the tree can drop down during the cut and after being severed, but remains within the grasp of the arms 142 and so, in all instances, the removed portion of the tree will not immediately fall to the ground, but instead be held by the tool 116. With the removed portion still being grasped, it can be directed to a chipper 200 using the boom 114 and tool 116 for chipping or may be loaded into the bed 112 of the truck 100 (which may be particularly desirable for logs). It is contemplated that the removed portion of the tree may also be temporarily dropped on the ground as illustrated in FIG. 1 and then re-grasped by the arms 142 so that the particular removed portion of the tree is not held by its end as this may be advantageous for manipulating the removed tree part.

It is contemplated that, in order to secure the feller buncher tool 116 after use and during travel over long distances, the feller buncher tool 116 may be removed and stored on the truck 100. In most instances, the boom 114 may be used to move the feller buncher tool 116 to a storage item (e.g., a cradle or box on the truck 100) and a pin or bolt in the joint 140 may be removed to separate the tool 116 from the boom 114 and the hydraulic lines 134 may be separated from the rotator 141. In this way, the tool 116 does not "bounce" during travel and there is no chance for the tool 116 to separate from the boom 114 or for the tool 116 to induce stress on the boom 114 during driving of the truck 100 on public roads. Short distances of travel at low speeds should not demand removal of the tool 116 from the boom 114 (for example, between immediately adjacent job sites).

Finally, it should be appreciated that, while the feller buncher tool attached to a truck has been described in the context of tree limb removal for tree removal in residential, commercial, municipal, utility, and line clearance applications, it should be appreciated that feller buncher tool might be attached to other types of vehicles for tree removal for tree removal in residential, commercial, municipal, utility, and line clearance applications. As one non-limiting example, it is contemplated that a feller buncher tool of this type could be attached to a boom on a barge or boat to remove trees around power lines from the water (where ground access may not be readily available) or on a train car in order to maintain or remove trees around a railway track.

Although specific embodiments are described above, it will be apparent to those of ordinary skill that a number of variations can be made within the scope of the disclosure. It should be understood, therefore, that the methods and apparatuses described above are only exemplary and do not limit the scope of the invention, and that various modifications could be made by those skilled in the art that would fall within the scope of the invention. To apprise the public of the scope of this invention, the following claims are made.

I claim:

1. A truck for tree limb removal in residential, commercial, municipal, utility, and line clearance applications, the truck comprising:
   a vehicle chassis supporting a plurality of wheels;
   a boom supported by the vehicle chassis having an attachment end attached to the vehicle chassis at an attachment joint and a tool-supporting end rotatable and extendable relative to the attachment joint;

a feller tool attached to the tool-supporting end of the boom having hydraulic lines extending up the boom to the feller tool in which the hydraulic lines provide power to the feller tool; and a spool mechanism receiving at least a portion of the hydraulic lines, the spool mechanism being configured to permit the hydraulic lines to be extended or retracted therefrom as the boom is actuated.

2. The truck of claim 1, wherein the feller tool includes at least a pair of opposing clamping arms configured to grasp a portion of a tree and a moveable cutting element extendable to cut a grasped portion of a tree wherein a portion of the feller tool including the at least the pair of opposing clamping arms is pivotable about a pivoting axis about another portion of the feller tool supporting the movable cutting element thereby accommodating a portion of a tree which is being grasped by the at least a pair of opposing clamping arms, when cut, to continue to be grasped by the at least the pair of opposing clamping arms as the portion of the tree is severed and removed from the tree under control as the portion of the feller tool supporting the pair of opposing arms pivots relative to the other portion of the feller tool supporting the movable cutting element.

3. The truck of claim 2, wherein the moveable cutting element is a chainsaw.

4. The truck of claim 1, further comprising a truck bed attached to the vehicle chassis for the storage of logs.

5. The truck of claim 1, wherein the boom includes multiple segments.

6. The truck of claim 5, wherein the multiple segments include at least one extendable segment that can be varied in length by telescoping extension of the plurality of section of the at least one extendable segment.

7. The truck of claim 5, wherein at least some of the multiple segments are hinged with respect to one another and a hydraulic element can alter an angle of the multiple segments with respect to one another.

8. The truck of claim 1, wherein the boom is rotatable about a vertical axis to position the feller tool with respect to the truck.

9. The truck of claim 8, wherein the boom is rotatable about a vertical axis in excess of 360 degrees.

10. The truck of claim 1, further comprising a remote control device operable to control the boom and the feller tool.

11. The truck of claim 1, wherein truck is adapted for use in residential, commercial, municipal, utility, and line clearance applications.

12. A method of removing a tree, the method comprising:
grasping a portion of the tree using a feller tool attached to a tool-supporting end of a boom attached to a truck for tree removal in residential, commercial, municipal, utility, and line clearance applications;
cutting the tree using the feller tool to sever the portion of the tree that is grasped by the feller tool from a remainder of the tree;
wherein the feller tool attached to the tool-supporting end of the boom has hydraulic lines extending up the boom to the feller tool in which the hydraulic lines provide power to the feller tool and wherein a spool mechanism receives at least a portion of the hydraulic lines and is configured to permit the hydraulic lines to be extended or retracted therefrom as the boom is actuated.

13. The method of claim 12, wherein the feller tool includes at least a pair of opposing clamping arms and a moveable cutting element, wherein the step of grasping the portion of the tree using the feller tool involves grasping the portion of the tree using the pair of opposing clamping arms, and wherein the step of cutting the tree using the feller tool involves extending the cutting element to cut the grasped portion of the tree.

14. The method of claim 13, wherein at least a portion of the feller tool including the at least the pair of opposing clamping arms is pivotable about a pivoting axis about another portion of the feller tool thereby accommodating the portion of the tree which is being grasped by the at least a pair of opposing clamping arms being cut to continue to be grasped by the at least a pair of opposing clamping arms as the portion of the tree that is severed from the tree.

15. The method of claim 12, wherein the boom is supported by a vehicle chassis supporting a plurality of wheels, the boom having an attachment end being attached to the vehicle chassis at an attachment joint and wherein the tool-supporting end is rotatable and extendable relative to the attachment joint.

16. The method of claim 12, further comprising the steps of transporting the portion of the tree that has been severed from the remainder of the tree to a chipper and chipping the portion of the tree.

17. A vehicle for tree limb removal in residential, commercial, municipal, utility, and line clearance applications, the vehicle comprising:
a vehicle chassis;
a boom supported by the vehicle chassis having an attachment end attached to the vehicle chassis at an attachment joint and a tool-supporting end rotatable and extendable relative to the attachment joint; and
a feller tool attached to the tool-supporting end of the boom, the feller tool having hydraulic lines extending up the boom to the feller tool; and
a spool mechanism receiving at least a portion of the hydraulic lines, the spool mechanism being configured to permit the hydraulic lines to be extended or retracted therefrom as the boom is actuated.

18. The truck of claim 1, wherein the truck is in a weight range of 26,000 pounds to 46,000 pounds.

19. The truck of claim 5, wherein the opposing arms of the feller tool provide a grapple for grasping a portion of a tree.

20. The truck of claim 1, wherein the truck further comprises an connection joint at the tool-supporting end of the boom that permits free rotation of the feller tool and a rotator in which the connection joint and the rotator are disposed in series with one another to connect the feller tool to the boom and wherein the connection joint includes a first bracket and a second bracket that are hingedly connected at a first hinged connection, wherein the first bracket is hingedly connected to a bracket connecting end positioned at the tool-supporting end of the boom at a second hinged connection, and the second bracket is hingedly connected to the rotator at a third hinged connection, and wherein an axis of the first hinged connection is perpendicular to and spaced from an axis of the second hinged connection and the axis of the first hinged connection is perpendicular to and spaced from an axis of the third hinged connection.

* * * * *